United States Patent [19]

Staüffer

[11] 4,296,088

[45] Oct. 20, 1981

[54] HEAT EXCHANGE TECHNIQUES FOR THE CATALYTIC OXIDATION OF GASEOUS SULFUR COMPOUNDS TO SULFUR TRIOXIDE

[75] Inventor: Adolf Staüffer, Pulheim, Fed. Rep. of Germany

[73] Assignee: Davy International Aktiengesellschaft, Cologne, Fed. Rep. of Germany

[21] Appl. No.: 96,127

[22] Filed: Nov. 20, 1979

Related U.S. Application Data

[63] Continuation of Ser. No. 888,597, Mar. 20, 1978, abandoned.

[30] Foreign Application Priority Data

Mar. 18, 1977 [DE] Fed. Rep. of Germany ....... 2711897

[51] Int. Cl.$^3$ ...................... C01B 17/76; C01B 17/80
[52] U.S. Cl. .................................... 423/533; 423/522; 422/160
[58] Field of Search ............... 423/522, 531, 532, 533, 423/529, 540; 23/261, 288 A; 422/160

[56] References Cited

U.S. PATENT DOCUMENTS

| | | | |
|---|---|---|---|
| 1,547,167 | 7/1925 | Downs | 423/533 |
| 1,812,341 | 6/1931 | Jaeger | 423/533 |
| 1,826,548 | 10/1931 | Jaeger | 423/533 |
| 1,900,715 | 3/1933 | Jaeger | 423/533 |
| 1,972,937 | 9/1934 | Jaeger | 423/533 |
| 2,023,203 | 12/1935 | Merrian | 423/533 |

*Primary Examiner*—Gary P. Straub
*Attorney, Agent, or Firm*—Millen & White

[57] ABSTRACT

In a process for the catalytic oxidation of gaseous sulfur compounds to sulfur trioxide comprising passing said gaseous sulfur compounds through a plurality of serially connected catalytic stages at 400°–580° C., the improvement which comprises circulating a liquid heat exchange medium in indirect heat exchange relationship to the reaction gases in the catalytic stages and with a heat consumer and optionally a heat source at a rate and amount such that the liquid heat exchange medium absorbs substantially all the exothermic reaction heat and fluctuates no more than 5 centigrade degrees, thereby controlling the temperature of said catalytic stages.

13 Claims, 5 Drawing Figures

HEAT EXCHANGE TECHNIQUES FOR THE CATALYTIC OXIDATION OF GASEOUS SULFUR COMPOUNDS TO SULFUR TRIOXIDE

This is a continuation of application Ser. No. 888,597 filed Mar. 20, 1978, now abandoned.

This invention relates to a process for the catalytic oxidation of gaseous sulfur compounds to sulfur trioxide in several stages wherein, in each stage, the reaction gas is maintained along the gas flow path at a temperature in the range from 400° to 580° C. by indirect heat exchange with a heat exchange medium, according to commonly invented Federal Republic of Germany Patent Application P 26 48 011.5, the contents thereof being incorporated by reference herein. The invention also relates to an apparatus for conducting this process, comprising a vessel containing, between two tube support plates, a plurality of tubes, at least part of which contains a catalyst, with domes for the feeding and discharging of the reaction gas.

In the conventional processes and apparatus for the catalytic oxidation of sulfur dioxide to sulfur trioxide, the gas to be oxidized is conducted through several layers of catalyst material—also called hurdles. These hurdles can be housed in one vessel or also in several vessels. The hurdles operate almost adiabatically, and in view of the exothermic reaction, a corresponding temperature rise occurs therein. Specific optimum inlet and outlet temperatures must be maintained in each hurdle. For this reason, the temperature of the reaction gas is lowered again between the hurdles by heat exchangers. Such a temperature control is nowise ideal, on account of the subdivision of the available quantities of heat connected with this process.

It is furthermore known in the catalytic oxidation of sulfur dioxide in tubular catalytic reactors to transfer the heat along the reaction path to the fresh feed gas. Due to the comparatively minor heat transfer of gas to gas, it was necessary, especially when making the transition to larger units, to subdivide the reaction path by intermediate heat exchangers. An ideal temperature control was not attained in this procedure, either.

All of these methods require special heating-up and cooling-down processes during the startup and shutdown of the plants; as a result, sulfuric acid plants, on account of the otherwise threatening corrosions to the fact that the temperature in case of interruptions of the operation would fall below the acid dew point, and the necessity of having to keep such plants in constant operation to avoid the aforedescribed problems, were deemed to be unsuitable for such a frequently interrupted operation by persons skilled in the art.

Another deficiency of the conventional methods resides in that the amounts of heat to be removed between the hurdles or catalyst stages, although corresponding in total to the heat requirement for heating the cold outlet gases or the gases after an intemediate absorption, do not correspond to such heat requirement in regard to the partial amounts obtained. For this reason, the heat exchangers must be subdivided in correspondence with the partial amounts of heat obtained and must be rendered controllable by bypasses for the special circumstances during startup or during variable operating conditions. As a consequence, the heat exchange surfaces for the normal operation are nowise dimensioned optimally, and the conduit installation system is expensive.

The present invention is based on the problem of avoiding the deficiencies occurring in the conventional sulfuric acid plants due to interruptions in operation. Moreover, a stable operation of the sulfuric acid plant is to be ensured even if the amounts of $SO_2$ to be processed fluctuate greatly or periodically are entirely absent. Additional advantages can be derived from the following description.

According to the invention, this problem is solved in the process described hereinabove by bringing a liquid heat exchange medium in heat exchange, on the one hand, with all catalyst stages and, on the other hand, with at least one heat consumer or optionally at least one heat supplier; circulating the heat exchange medium between the catalyst stages and the heat consumer or supplier; and limiting its temperature fluctuations during circulation to maximally about 5° C. In the process of this invention, optimum operating conditions are substantially more quickly attained during the startup and shutdown of the plants and during varying $SO_2$ contents in the gas. The heat of reaction is transferred along the gas flow path to a liquid heat exchange medium which, in case of a multistage operation, preferably pertains to all stages combined, so that the entire heat of reaction is absorbed by the heat exchange medium and is available as a whole. Therefore, it is unnecessary to provide heat exchangers for the transfer of partial amounts of the heat of reaction. The thus-absorbed amount of heat can be transmitted in its entirety by the heat exchange medium to a heat consumer. The heat exchange medium is circulated so vigorously in this process that a temperature difference of only a few degrees, maximally about 5° C., occurs therein, i.e. the temperature of the heat exchange medium on the downstream side of the catalyst stages is only maximally about 5° C. higher than the temperature of the heat exchange medium on the downstream side of the heat consumer. Conversely, if the amount of heat developed in the catalyst stages is too low, or is missing, for example when processing gases having a very low sulfur dioxide concentration and/or in case of standstill, it is possible to supply heat to the heat exchange medium by the heat producer, so that the catalyst stages and the heat exchange medium proper are maintained at the operating temperature in spite of an insufficient liberation of heat by catalytic oxidation. Also in this case will the temperature difference in the heat exchange medium cycle amount to maximally 5° C., wherein the heat exchange medium temperature is highest on the downstream side of the heat producer.

The process of this invention is especially advantageous if an absorption of the sulfur rioxide is effected between the catalyst stages because in this case, by way of the exchange with the common heat transport agent, all stages always exhibit the correct operating temperature simultaneously. To cover the heat requirement during the reheating step after the intermediate absorption, there is no necessity to rely on limited, partial quantities of heat available at various places of the process; rather, the required heat is available in a total amount and can be transferred in one heat exchanger.

A special advantage of the process according to the invention resides in that the disadvantages heretofore connected with an interruption of the operation in a sulfuric acid plant are eliminated. When a sulfuric acid plant of the type heretofore known is shut down, sulfuric acid condensates are produced due to the cooling process, leading to corrosions of the material and damage to the catalyst. The startup requires several hours and, during this time, results in considerable harm to the environment due to the emission of $SO_2$, since the catalyst does not become active immediately due to the fact that the gas temperature is too low. In the process of this invention, all catalyst stages are maintained, even after cessation of the gaseous stream, at such a temperature that the reaction, after the gaseous stream is reinstated, is initiated immediately. For this purpose, the liquid heat exchange medium is heated by supplying heat thereto. Since the catalytic reactor is insulated, only a minor amount of heat is necessary for keeping the plant warm for days. Such a flexible mode of operation is especially important if sulfur dioxide is not obtained in a chronologically constant quantity, as is the case, for example, when removing $SO_2$ from flue gases by absorption or adsorption with periodic regeneration of the absorbent or adsorbent.

According to a preferred embodiment of the process of this invention, the reaction gas is brought into heat exchange with the heat exchange medium on the course between the catalyst stages. The reaction path, in this way, is interrupted by heat exchange paths along which the temperature of the reaction gas is lowered within the temperature range of 400°–580° C. critical to the oxidation. In this way, the gas temperature can be made to approach more closely the optimum temperature curve than possible in adiabatic catalyst stages with intermediate cooling.

According to a further preferred embodiment, the provision is made that the reaction gas is reacted substantially adiabatically before, after or between the catalyst stages temperature-controlled by the heat exchange medium. If, in the catalyst stages under the temperature control of this invention, the evolution of heat at the beginning of the reaction is inadequate for approximately attaining the optimum reaction temperature, then it is suitable to begin the oxidation adiabatically in a catalyst layer, a customary first hurdle, and, after the optimum reaction temperature has been exceeded, to continue the oxidation in the catalyst stages temperature-controlled with the liquid heat exchange medium in accordance with this invention.

According to another embodiment, the provision is made to oxidize a gas which contains hydrogen sulfide, carbonyl sulfide, carbon disulfide, and vapor-phase sulfur, especially a Claus waste gas. The process of this invention affords a troublefree processing to sulfur trioxide especially in case of gases with a strongly fluctuating concentration of the sulfur compounds. With a high concentration of the sulfur compounds, the excess heat is readily removed without overheating of the catalyst and of the apparatus. If the concentration of the sulfur compounds is greatly lowered, the heat balance of the total process can be improved by heating the heat exchange medium so that the oxidation continues even in such a case. Due to the process of this invention, a previous combustion of the sulfur compounds and thus an undesired dilution of the gases passing to the catalytic oxidation are avoided.

Advantageously, the circulating liquid heat exchange medium is brought, for purpose of maintaining the temperature, in to heat exchange with the process gas, water, or steam to be heated up. The heat absorbed in the catalyst stages and, in certain cases, in the heat exchange tubes arranged between the catalyst stages serves for heating the process gas to the start-up temperature for the contact heat and/or for evaporating water and/or for superheating steam. It is also possible to transfer the excess heat by heat exchange to a second liquid heat exchange medium and to utilize the latter for some other heating purposes. The temperature of the heat transport agent surrounding the tubes can lie, depending on the requirements, somewhat above the startup temperature of the catalyst, or it can also be equal to the optimum temperature of an only very weak exothermic stage, for example in correspondence with the fourth hurdle of a conventional hurdle catalyst apparatus.

The liquid heat exchange medium can furthermore be placed in heat exchange with hot combustion gases as the heat supplier. The temperature of the combustion gases can be in the range of 600°–1200° C., preferably 800°–1100° C.

Suitably, the heat exchange medium employed is a brine melt or a liquid metal, especially liquid lead. Suitable brine melts are alkali metal halogenides and nitrates, optionally in a mixture with nitrite.

It is furthermore possible to maintain the catalyst and heat exchange stages on the side of the reaction gas under a pressure in the range from 1 to 500 kg./cm$^2$, preferably under a pressure in the range from 1 to 50 kg./cm$^2$. The heat evolution in the catalyst stages, which is substantially greater due to the increased pressure, can be readily controlled according to the process of this invention, as contrasted to the mode of operation wherein the catalyst stages are cooled by fresh gas.

The process of this invention is not limited to the sulfur dioxide concentrations customary in the catalytic oxidation of $SO_2$ to $SO_3$. The advantages of the process according to the invention manifest themselves especially in novel methods operating with high sulfur dioxide or oxygen contents in the contact gas. These contents can attain, in individual caser, values up into the range of 100%.

The apparatus for conducting the process of this invention consists of a vessel containing a plurality of tubes between two tube plates, at least a portion of these tubes containing a catalyst, wherein the vessel comprises domes for the feeding and discharging of the reaction gas. This apparatus is characterized, according to the invention, in that individual tube groups are associated with individual domes or with dome chambers formed in a dome by means of partitions; that the domes or dome chambers, with the associated, catalyst-filled tube groups, are connected in series with respect to flow dynamics; and that the space around the tubes is filled with the heat exchange medium and connected to a circulating system for the heat exchange medium comprising at least one heat exchanger. Accordingly, the catalytic reactor of this invention houses, just as a customary hurdle catalytic reactor, several catalyst stages. Each catalyst stage consists of a group of parallel tubes extending between the two tube plates in which the catalyst is located. The heat exchange liquid flows around the outside of the tubes, the flow direction of the liquid with respect to the reaction gas being of only subordinate importance, since due to the high circulating velocity there cannot occur any substantial temperature differences in the liquid. The domes and/or dome chambers at the end faces of the vessel take care that the reaction gas flows to the desired tube group and/or is discharged therefrom and guided into a subsequent tube group. The circulating system with the heat exchanger arranged therein and with a circulating pump take care that the temperature of the heat exchange medium is constantly maintained at the level required for optimum conversion. Since, in the oxidation of SO₂ to SO₃, about 23 kcal./mole are liberated, considerable amounts of heat are removed by the liquid heat exchange medium during operation. The domes and/or dome chambers can have separate connecting nipples so that the reaction gas can be discharged from the reactor already after passing through one tube group. However, advantageously, the reaction gas is conducted in succession through several tube groups. In this case, only the dome of the first tube group on the inlet side and the dome of the last tube group on the outlet side have connecting nipples for the feeding and/or discharging of the gas. The remaining domes or dome chambers serve merely for conducting the reaction gas from one tube group into the subsequent tube group. This transfer is attained, for example, by providing the partition between two dome chambers with an aperture so that the reaction gas can flow from the dome chamber of a tube group on the downstream side into the dome chamber of the subsequent tube group on the upstream side.

In accordance with the preferred embodiment, tube groups with catalyst filling and tube groups without catalyst filling are connected in series from the viewpoint of flow dynamics. Although the heat liberated by contact oxidation in the catalyst-filled tube groups is already substantially removed by the flow of medium around this tube group, it may be advantageous to interpose additional tube groups without catalyst filling between the catalyst-filled tube groups; these additional tube groups serve merely for heat exchange between the reaction gas and the heat exchange liquid. The tubes without a catalyst filling can either be empty or, to improve the heat exchange, can be filled with a catalytically inactive material. In this way, heat exchangers which in the conventional contact apparatus are arranged outside of the hurdle reactor are housed within the reactor. Thereby the investment costs are reduced, and it is possible to absorb the quantity of heat released by the contact oxidation in its entirety by the heat exchange medium after a one-time passage through the reactor. The catalyst-filled tubes, or a portion thereof, can also be only partially filled with the catalyst. These tubes then serve, in their catalyst-free zone, for heat exchange between reaction gas and heat exchange medium and, in their catalyst-filled zone, for the contact oxidation. The heat transfer to the liquid heat exchange medium is so satisfactory that, except for a short heating-up zone, almost ideal temperature relationships are obtained along the contact path. It is possible to attain coefficients of thermal conduction of about 100 kcal./m² · h · °C.

In one embodiment of the apparatus of this invention, the catalyst-filled tube groups are preceded, interposed by, or succeeded by at least one substantially adiabatically operating catalyst layer. If the heat developed at the beginning of the reaction does not suffice for reaching an optimum reaction temperature, it is possible to connect an adiabatically operating catalyst layer upstream of the apparatus of this invention, whereby a greater temperature rise is obtained.

The heat exchanger in the circulating system can be a liquid/gas heat exchanger, a waste heat boiler, or a steam superheater. The heat liberated during the contact oxidation is again released by the liquid heat exchange medium in these devices so that the temperature is maintained at the desired level. It is also possible to transfer the heat in an exchanger to a second heat exchange liquid which serves, for example, for heating apparatus external to the process.

Furthermore, the provision is made that at least one catalyst-free tube group can be connected to a combustion chamber serving for the production of hot combustion gases. If the apparatus has need for heat, for example due to a strong reduction in the SO₂ content of the feed gas or due to an interruption of the gas feed, than a fuel is burned in the combustion chamber. The thus-produced, hot combustion gases pass the tube group intended therefor and thus maintain the temperature of the heat exchange medium so that the reaction can be resumed at any time with full load. It is, of course, also possible to maintain the heat exchange liquid at the desired temperature in a separate heat exchanger with the aid of the combustion gas. It is furthermore possible to distribute the contact stages among two or more reactors, rather than accommodate same in one reactor. However, preferably, all stages of the process are housed in one vessel wherein the dimensioning of the tubes is such that the process is self-stabilizing, i.e. under fluctuating loads the process automatically enters stable, maximally optimum operating conditions without having to utilize any other regulating means than those provided for the temperature of the heat exchange medium. Although the combustion gases are generally produced by the combustion of a gaseous or liquid hydrocarbon or hydrocarbon mixture, it is also possible to utilize sulfur combustion gases for heating the heat exchange medium and then to admix these gases to the gas to be processed.

In accordance with the preferred embodiment, the reactor has substantially the shape of a vertically disposed cylinder passed through by vertical tubes.

Preferably, the ratio of length to diameter of the tubes filled with the catalyst is in the range of 10–200, and that of the catalyst-free tubes is in the range of 60–300. Bu the choise of the tube diameter, it is possible to adapt the heat removal to the respective sulfur dioxide or oxygen concentration of the reaction gas. With small tube diameters, preferably about 2–5 cm., it is also possible to control a strong evolution of heat as it occurs at high SO₂ and O₂ concentrations or under high pressures.

The invention will be explained in greater detail below with reference to the drawings wherein.

Figure 1:
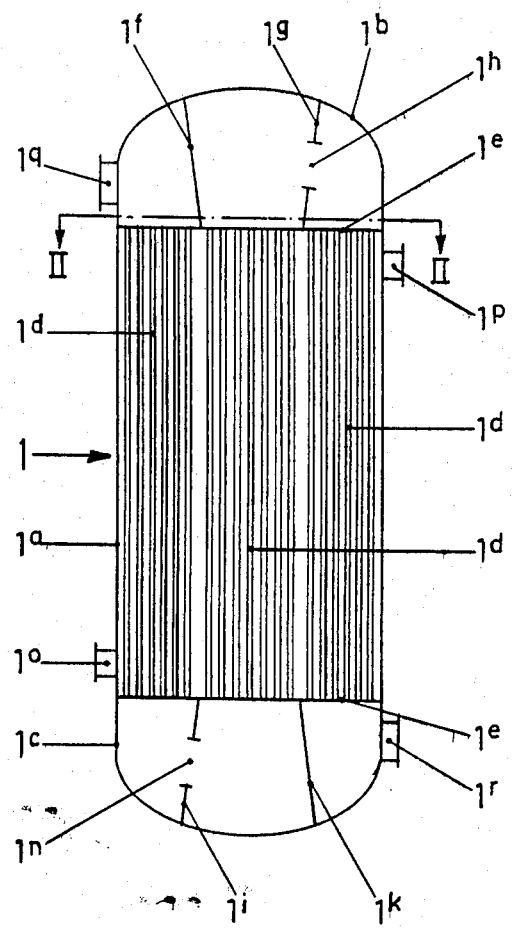
FIG. 1 is a cross-sectional view of a contact apparatus for conducting the process of this invention with three tube groups.
Figure 2:
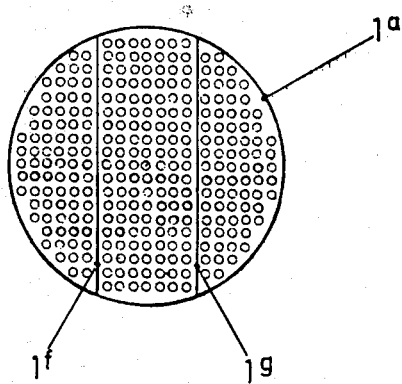
FIG. 2 is a section along line II—II of FIG. 1.

According to FIGS. 1 and 2, the contact reactor 1 consists of an essentially cylindrical jacket $1^a$ with respectively one dome $1^b$, $1^c$ arranged at the end face and with two tube plates $1^e$ between which three tube groups $1^d$ extend. The interior of the dome $1^b$ is subdivided into three chambers by the walls $1^f$, $1^g$, each chamber being associated with one tube group $1^d$. In the wall $1^g$ an overflow port $1^h$ is provided. In the same way, the interior of the lower dome $1^c$ is subdivided into three corresponding chambers by the walls $1^i$ and $1^k$. In the wall $1^i$, there is likewise an overflow port $1^n$. The heat exchange liquid is fed to the apparatus via the connecting pipe $1^o$ and discharged via the connecting pipe $1^p$. The gaseous stream containing the sulfur compounds to be reacted enters via the connecting pipe $1^q$ into the chamber of dome $1^b$ shown on the left-hand side in FIG. 1, flows through the left-hand tube group $1^d$ filled with catalyst, and then exits from the left-hand chamber of dome $1^c$ via the overflow port $1^n$ into the middle dome chamber. The partially reacted gas then flows in the upward direction through the middle group of empty tubes $1^d$ wherein merely part of the heat of reaction is withdrawn from the reaction gas. The gas then flows from the middle chamber of dome $1^b$ via the overflow port $1^h$ into the right hand dome chamber and from there through the right-hand, catalsyt-filled tube group $1^d$ to the exhaust pipe $1^r$. The catalyst-filled tube groups and the middle group of empty tubes are surrounded by the flow of the same heat exchange medium which is fed via the connecting pipe $1^o$ and is discharged via the connecting pipe $1^p$.

Figures 3, 4, 5:
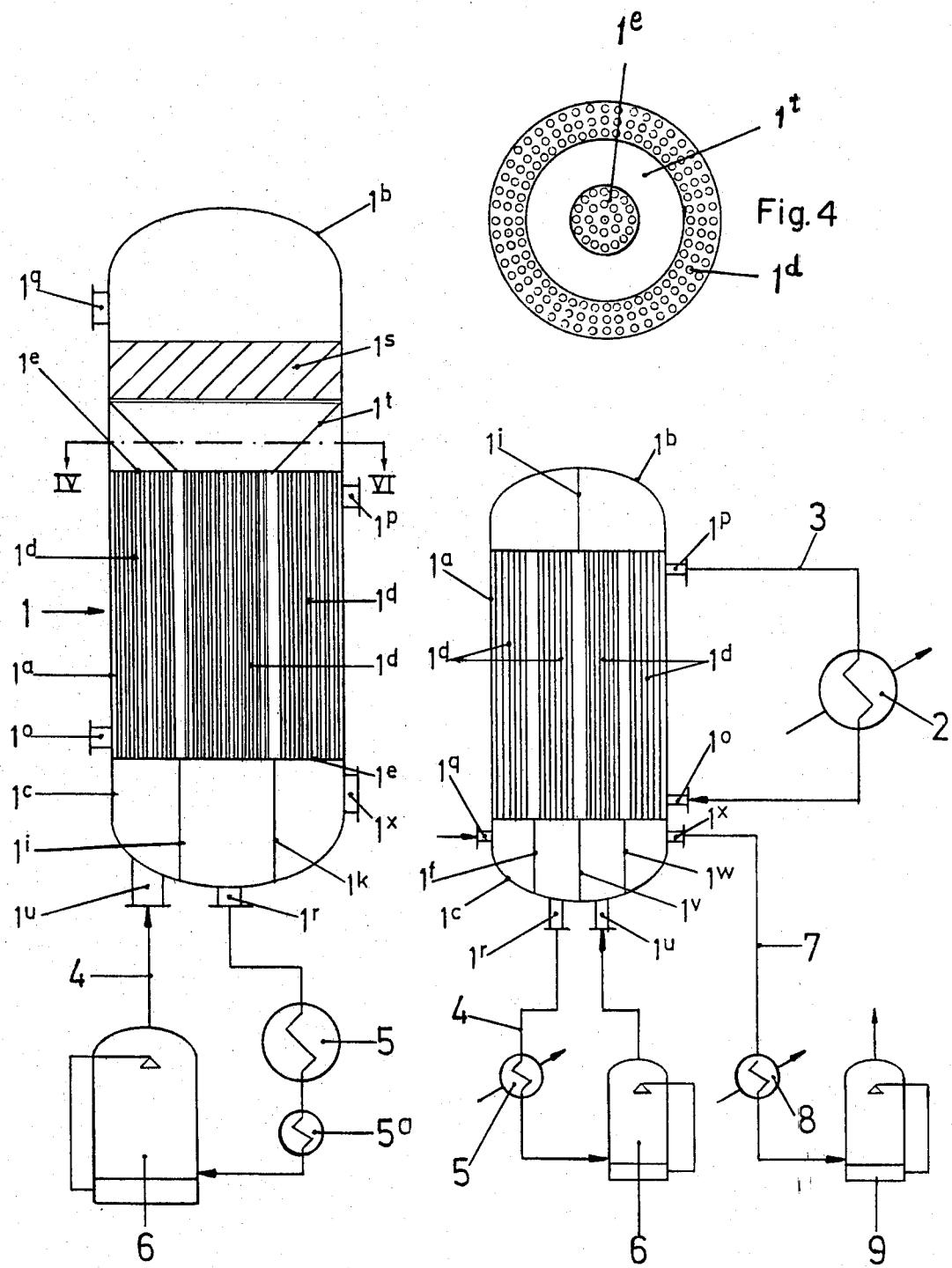
FIG. 3 shows a second embodiment of a contact reactor for conducting the process of this invention in a cross section with three tube groups and an adiabatic contact stage connected in front thereof.
FIG. 4 shows a section along line IV—IV of FIG. 3.
FIG. 5 shows a plant for conducting the process of this invention with a contact reactor with four tube groups and dual absorption of the thus-formed sulfur trioxide.

In the contact reactor shown in FIGS. 3 and 4, identical reference numerals have been used for those parts analogous to the components in FIGS. 1 and 2. This contact reactor differs from that shown in FIG. 1 essentially in that an uncooled catalyst stage $1^s$, i.e. one which operates substantially adiabatically, is connected upstream of the cooled tube catalyst stages $1^d$. The gas to be reacted, entering the contact reactor via the connecting pipe $1^q$, first flows through the catalyst layer $1^s$ and is then conducted through the truncated-cone wall $1^t$ into the central tube group $1^d$ which is filled with catalyst. After passing the central tube group $1^d$ and additional reaction, the reaction gas flows through the central dome chamber into the intermediate absorption section of the plant, consisting of the waste heat boiler 5, the economizer $5^a$, and the absorber 6. After cooling in 5 and $5^a$, the reaction gas transfers its sulfur trioxide to the circulating sulfuric acid in absorber 6. The gas, freed of sulfur trioxide, passes through conduit 4 and connecting pipe $1^u$ into the chamber of dome $1^c$ on the left-hand side of the partition $1^i$ and is then reheated to the reaction temperature in the left tube bundle $1^d$, which is empty. After leaving this tube bundle, the reaction gas flows underneath the truncated-cone wall $1^t$ into the right-hand tube group wherein the sulfur dioxide still present in the gas is reacted to sulfur trioxide. The gas leaves the contact reactor through the dome chamber on the right-hand side of the partition $1^k$ and via the connecting pipe $1^x$.

FIG. 5 shows a plant for conducting the process of this invention schematically, with dual absorption. The gas to be reacted enters via connecting pipe $1^q$ into the left-hand chamber of the dome $1^c$ of the contact reactor, subdivided by the partition $1^j$, then flows upwardly through the first group of tubes $1^d$, is then deflected in the left-hand chamber of the dome $1^b$ subdivided by the partition $1^i$, and flows in the downward direction through the second tube group $1^d$ which is not filled with catalyst. The partially reacted gaseous mixture exits via the connecting pipe $1^r$, then flows through conduit 4 to heat exchanger 5, wherein it is cooled to the absorption temperature. The gas is freed of sulfur trioxide in the absorption tower 6, enters via the connecting pipe $1^u$ into the chamber formed between the partitions $1^v$ and $1^w$ of dome $1^c$, and then flows in the upward direction through the third group of tubes $1^d$; in the upper part of these tubes, the heating step is conducted, first of all, and the further reaction takes place in the upper part of these tubes. After another deflection in the right-hand chamber of dome $1^b$, the gas flows through the fourth group of tubes $1^d$ which is only partially filled with catalyst, so that a certain recooling takes place in the upper portion and the residual reaction takes place in the lower portion. The thus-reacted gaseous mixture exits from the connecting pipe $1^x$, passes via conduit 7 to the heat exchanger 8, and is freed of the thus-formed sulfur trioxide in absorber 9.

All four groups of tubes $1^d$ are under the effect of the same heat exchange medium which exits via the connecting pipe $1^p$ from the contact reactor. The heat exchange medium passes through the circulating conduit 3 into the heat exchanger 2 where the thus-absorbed heat of reaction is removed from the medium. The thus-recooled heat exchange medium reenters the contact reactor via the connecting pipe $1^o$. The circulation rate produced by suitable pumps (not shown) is so high that the temperature of the heat exchange liquid exiting from the connecting pipe $1^p$ is at most 5° C. higher than the temperature of the liquid flowing back into the contact reactor via the connecting pipe $1^o$.

EXAMPLE 1

In a plant of the type shown in FIG. 3, a sulfur combustion gas with 10 vol.-% $SO_2$ and 11 vol.-% $O_2$ and at a temperature of 460° C. is first of all conducted to the catalyst hurdle which contains such an amount of catalyst that approximately a 45% conversion is attained at 585° C. Thereupon, the gas is conducted into the first group of catalyst-filled tubes, the brine bath temperature being maintained at 440° C. In this tube group, the gas is reacted to an extent of 95%. Then, after the usual cooling of the gas in a waste heat boiler and an economizer, the sulfur trioxide is absorbed in an intermediate absorption stage; the gas, freed of $SO_3$, is heated to 440° C. in a second group of empty tubes of the contact reactor, and is then conducted to a third group of tubes filled with catalyst and reacted to an extent of 95%. In this way, a total conversion of 99.75% is attained.

EXAMPLE 2

In a plant according to FIG. 5, an $SO_2$-containing gas, the quantity of which fluctuates periodically, is being processed which is obtained during the description of $SO_2$ from several adsorbers used for flue gas desulfuration. The gas contains 20 vol.-% $SO_2$ and 16.8 vol.-% $O_2$ and enters the first group of empty tubes at about 50° C.; in this group of tubes, the gas is heated to 420° C. and then passes through a first group of catalyst-filled tubes wherein it is reacted to an extent of 90%. After the usual cooling step, the gas is freed of $SO_3$ in an intermediate absorption and subsequently heated in a second group of empty tubes to 420° C. and then again reacted to an extent of 90% in a second tube group filled with catalyst. In this way, a total conversion of about 99% is attained. The cube groups are temperature-controlled with the use of a brine bath of sodium nitrite and potassium nitrate. The brine melt is cooled in a steam generator located outside of the contact reactor, and during this step the periodically absorbed heat of oxidation is removed from the circulating melt. There is no need to heat the melt in the phases wherein no desorption gas is being supplied, since these phases last only about 6 hours and during this time the contact reactor is maintained without external heat supply at the startup temperature of the catalyst.

EXAMPLE 3

5,000 Nm$^3$/h. of a gas containing 2.0% $H_2S$; 8.0% $CO_2$; 16% $O_2$; 0.5% $H_2O$; minor amounts of CO, $H_2$, COS, and otherwise $N_2$ is processed in accordance with this invention in a contact reactor containing 360 tubes having a length of 2 m. and an inner diameter of 12 cm.; these tubes are combined into four groups by appropriately constructed gas feed and discharge domes. The first group of 45 tubes is connected to a combustion chamber and has an outlet into the atmosphere, for example by way of a small sheet-metal flue. This group of tubes serves for the heating up or for maintaining the heat during interruptions in operation. The second group of likewise 45 tubes serves for preheating the gases entering from the bottom and then passing via a top dome from above into the third group of 90 tubes filled with the customary catalyst material for the sulfuric acid manufacture. Through a lower guide dome, the gases then enter from below into the fourth group of 180 tubes, likewise filled with catalyst material. The preheating is conducted to about 320° C., the reaction to $SO_3$ reaches approximately 98%. The tubes of the contact reactor are surrounded by a potassium nitrate-sodium nitrite melt which is very intensively circulated. A brine bath cooler is unnecessary in this case. The brine bath temperature is adjusted to about 440° C. thereby and should also be maintained at this value, which is done by adding air if the $H_2S$ concentration rises, or by placing the additional heating unit for the first tube group in operation in case of weaker gases. The gas leaving the contact reactor is cooled in the usual manner in a condensation tower with mist filter, just as in a moist gas catalysis, from 440° C. to about 70° C. and in this way yields a 94–96% strength acid.

EXAMPLE 4

10,000 Nm$^3$/h. of a gas having a temperature of about 130° C. and containing 14.0% $SO_2$; 1.0% COS; 0.6% $CS_2$; 0.5% $H_2S$; 0.6% CO; 2.5% $H_2O$; 12.0% $CO_2$; 78.8% $N_2$ is processed in accordance with the invention in a contact reactor containing 1,000 tubes having a length of 2.5 m. and an internal diameter of 7 cm. These tubes are combined into five groups by suitable gas feed and discharge domes. The first group of 50 empty tubes is connected to a combustion chamber and has an outlet to the atmosphere via a flue. This group serves for heating or maintaining the heat during interruptions in operation, but also for cooling purposes, if very strong gas enters the system for a temporary period. In this case, cold outside air is blown through these tubes, with the combustion chamber switched off. A second group of 100 empty tubes serves for preheating the gases, and a third group of 80 empty tubes serves for preheating 5,000 Nm$^3$/h. of air. The air and the gas then enter a common deflecting dome and then enter the fourth group of 300 tubes, filled with a suitable catalyst. Finally, the gases enter a fifth group of 530 tubes, filled with catalyst. The primary reaction with the greatest evolution of heat takes place in the fourth tube group. Upon exit of the gas from the contact apparatus, a conversion is attained of about 98%. The brine bath serving for the cooling of the tubes is maintained at 420° C. The excess heat is removed via a steam boiler element. Subsequently to the contact oxidation, the $SO_3$- and steam-containing gas is fed, as is done in a moist gas catalysis, to a condensation tower with mist filter for the formation of 98% sulfuric acid.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

The temperature variance in the catalytic stages themselves have to be selected according to maximum conversion with minimum catalyst requirement observing upper temperature limits for the catalyst following instructions of the catalyst producers and may vary for example between 400 and 600 C. for conversion from 0 to 50%, and from 600 to 460 C. for conversion from 50 to 90%, and between 460 to 430 C. for conversion between 90 and 98%. All of these figures depend on gas composition and catalyst characteristics as well known to one skilled in the art. Suitable temperature variance can be achieved for example by proper harmonizing of tube diameter with gas velocity and salt bath temperature.

What is claimed is:

1. In a process for the catalytic oxidation of gaseous sulfur compounds to sulfur trioxide comprising passing said gaseous sulfur compounds through a plurality of serially connected spatially separate zones, each zone being either a catalytic reaction zone which, optionally is in contact with a heat exchange medium or, an uncatalyzed heat exchange zone, and there being at least one catalytic zone in indirect contact with the heat exchange medium and one said heat exchange zone, the improvement which comprises using a liquid heat exchange medium and for each of said catalytic reaction zones which is in contact with said heat exchange medium and for said spatially separate heat exchange zones, the heat exchange is accomplished by circulating said liquid heat exchange medium in indirect heat exchange relationship therewith and with a heat consumer or heat source; the circulation rate being high enough and the amount of the medium being such that the liquid heat exchange medium exchanges heat in said heat exchange zones, said heat exchanged catalytic reaction zones and said heat consumer or source and has a temperature differential of no more than 5 centigrade degrees throughout the circulation path of said heat exchange medium, thereby controlling the temperature of said heat exchange zones; said liquid heat exchange medium remaining liquid throughout the circulation thereof.

2. The process according to claim 1, wherein the reaction gas is brought into heat exchange with the heat exchange medium in a heat exchange zone along the path between the catalyst zones.

3. The process according to claim 1, wherein the reaction gas is substantially adiabatically reacted in an additional non-temperature-controlled catalyst stage upstream of, between, or downstream of said oxidation stages which are temperature-controlled with the heat exchange medium.

4. The process according to claim 1, wherein a gas is oxidized which contains hydrogen sulfide, carbonyl sulfide, carbon disulfide, and vapor-phase sulfur, especially a Claus waste gas.

5. The process according to claim 1, wherein the liquid heat exchange medium is brought into heat exchange with the process gas, water, or steam to be superheated, as the heat consumer.

6. The process according to claim 1, wherein the liquid heat exchange medium is brought into heat exchange with hot combustion gases as the heat supplier.

7. The process according to claim 1, wherein a brine melt or a liquid metal is the liquid heat exchange medium.

8. The process according to claim 1, wherein the catalyst and heat exchange zones on the side of the reaction gas are maintained under a pressure in the range of 1–500 kg./cm$^2$.

9. A process according to claim 1 wherein at least one of the serially connected catalytic zones has a temperature of 430°–460° C.

10. A process according to claim 1, wherein the reaction gases in the catalytic zones are passed through tubes filled with catalysts, said liquid heat exchange medium being circulated around said catalyst tubes.

11. A process according to claim 10, wherein all of the catalyst tubes are contained in a single tank in which the heat exchange medium is circulated and said liquid heat exchange medium is passed in indirect heat exchange relationship with the reaction gases in a further zone external of said tank.

12. A process of claim 10, wherein all of the catalyst tubes are contained in a single tank in which the heat exchange medium is circulated and the tank also contains tubes not filled with catalyst, which are serially connected to said catalyst filled tubes and around which said liquid heat exchange medium is also circulated, whereby the non-catalyst filled tubes constitute spatially separate heat exchange zones, through which the reaction gases flow.

13. A process of claim 12 wherein the tank further comprises a catalyst bed serially connected to said tubes but not in heat exchange relationship with the heat exchange medium.

* * * * *